United States Patent
Ren et al.

(10) Patent No.: US 8,885,691 B1
(45) Date of Patent: Nov. 11, 2014

(54) VOLTAGE REGULATOR FOR A SERIALIZER/DESERIALIZER COMMUNICATION APPLICATION

(71) Applicant: Inphi Corporation, Santa Clara, CA (US)

(72) Inventors: Guojun Ren, Santa Clara, CA (US); Karthik S. Gopalakrishnan, Santa Clara, CA (US)

(73) Assignee: Inphi Corporation, Santa Clara, CA (US)

( * ) Notice: Subject to any disclaimer, the term of this patent is extended or adjusted under 35 U.S.C. 154(b) by 36 days.

(21) Appl. No.: 13/775,041

(22) Filed: Feb. 22, 2013

(51) Int. Cl.
- *H04B 1/38* (2006.01)
- *H04L 5/16* (2006.01)
- *G05F 1/10* (2006.01)
- *H04B 3/30* (2006.01)

(52) U.S. Cl.
CPC ... *G05F 1/10* (2013.01); *H04B 3/30* (2013.01)
USPC .......................................... 375/219; 375/319

(58) Field of Classification Search
USPC ................................................. 375/219, 319
See application file for complete search history.

(56) References Cited

U.S. PATENT DOCUMENTS

| | | | |
|---|---|---|---|
| 5,122,689 A | 6/1992 | Barre | |
| 7,020,227 B1 | 3/2006 | Wang et al. | |
| 8,116,418 B2 | 2/2012 | Chien | |
| 8,164,493 B2 | 4/2012 | Hsieh | |
| 8,228,110 B1 | 7/2012 | Song et al. | |
| 8,395,446 B1 | 3/2013 | Tran | |
| 8,427,122 B2 * | 4/2013 | Dasgupta | 323/280 |
| 8,648,580 B2 * | 2/2014 | Wong | 323/265 |
| 2007/0121711 A1 | 5/2007 | Offord et al. | |
| 2007/0146014 A1 | 6/2007 | Cheung | |
| 2009/0304054 A1 | 12/2009 | Tonietto et al. | |
| 2012/0189086 A1 | 7/2012 | Cai et al. | |
| 2013/0176006 A1 * | 7/2013 | van Ettinger et al. | 323/265 |
| 2013/0207707 A1 | 8/2013 | Agrawal et al. | |

OTHER PUBLICATIONS

"CEI-28G-VSR Very Short Reach Interface," Physical Link Layer (PLL) Implementation Agreement, Draft 10.0 0 , , OIF2010.404.10, May 21 2013.*
Office Action for U.S. Appl. No. 13/802,620, dated Feb. 21, 2014.
Office Action for U.S. Appl. No. 13/802,248, dated Mar. 27, 2014.

* cited by examiner

*Primary Examiner* — Shuwang Liu
*Assistant Examiner* — Nader Bolourchi
(74) *Attorney, Agent, or Firm* — Richard T. Ogawa; Ogawa P.C.

(57) ABSTRACT

The voltage regulator device has a wide band amplifier having an input reference voltage, Vref and an input feedback voltage, Vfbk. The device has a source follower coupled to the wide band amplifier, the source follower coupled to an output of the wide band amplifier. The device has a VDD source, a regulator output, and a current source coupled to the source follower and the VDD source. The device has a low frequency path comprising a first transistor. The first transistor has a first gate, a first source, and a first drain. The first source is coupled to the VDD source. The first gate is coupled to a slow node, and the first drain is coupled to the regulator output. The low frequency path comprises a RC network, which has a capacitor, a resistor, and the slow node configured between the resistor and the capacitor. The device has a high frequency path comprising a second transistor. The second transistor has a second gate, a second source, and a second drain. The second source is coupled to the VDD source. The second gate is coupled to a fast node, and the second drain is coupled to the regulator output.

20 Claims, 12 Drawing Sheets

SerDes Block Diagram

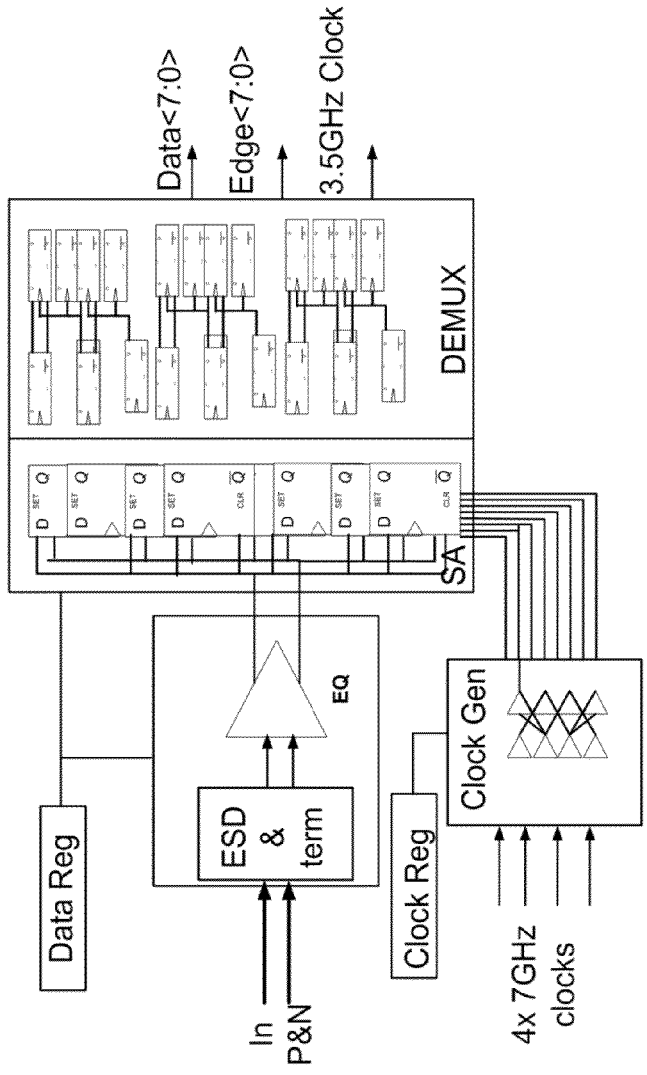

Receiver Equalizer

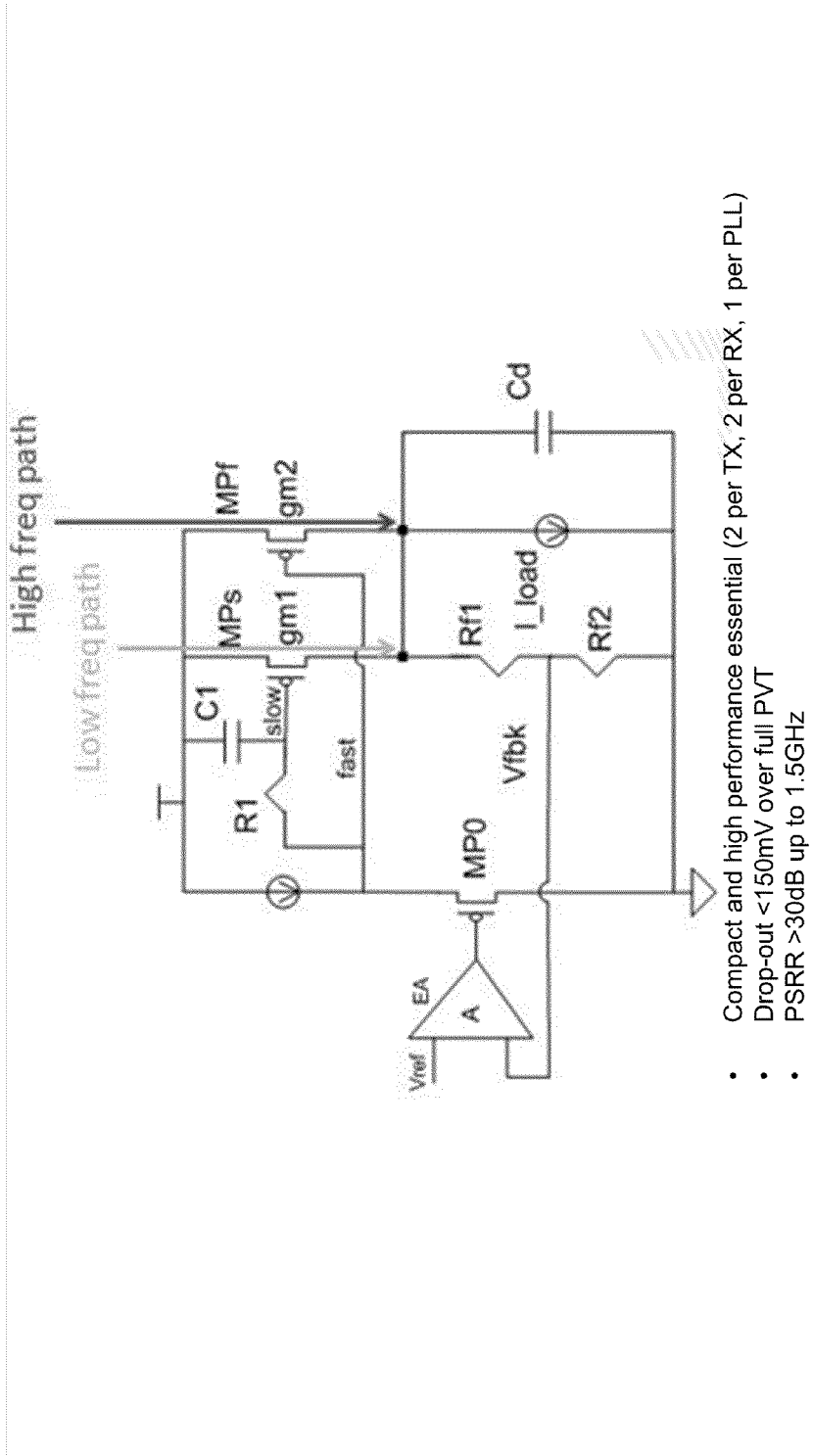

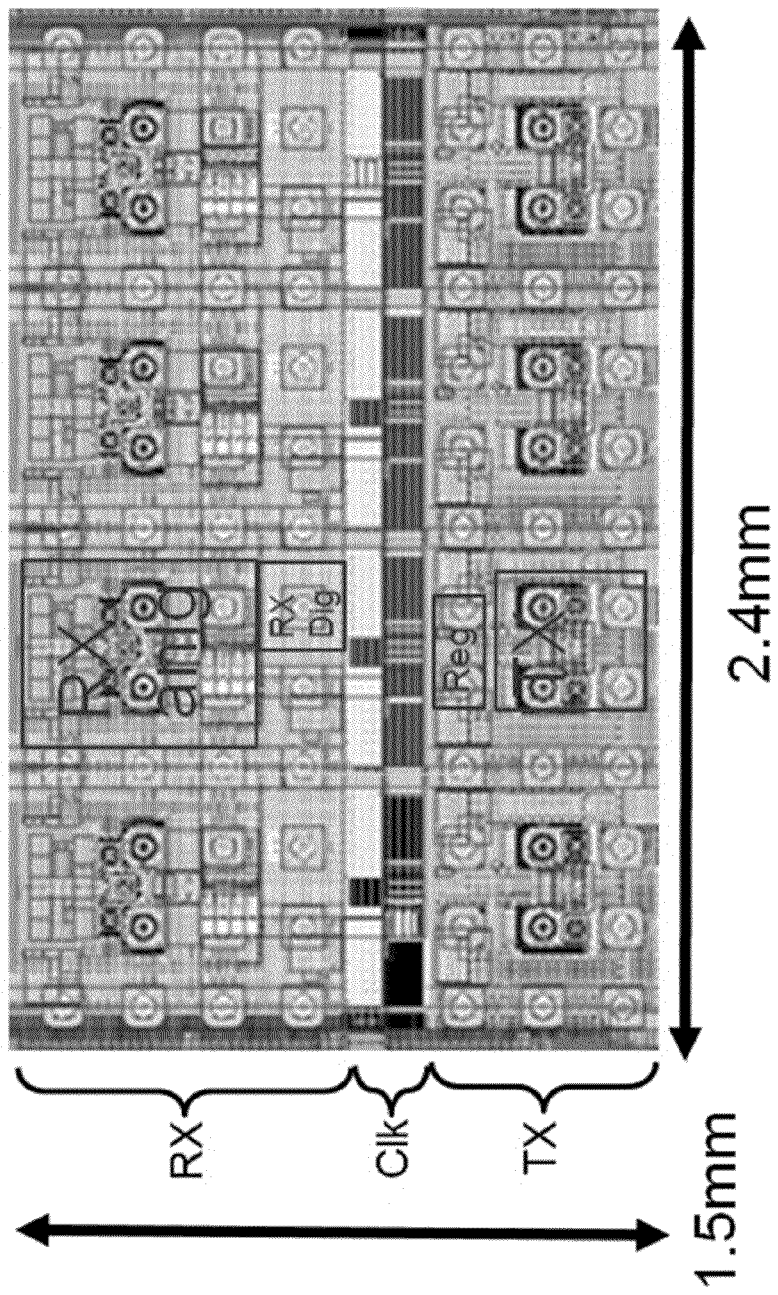

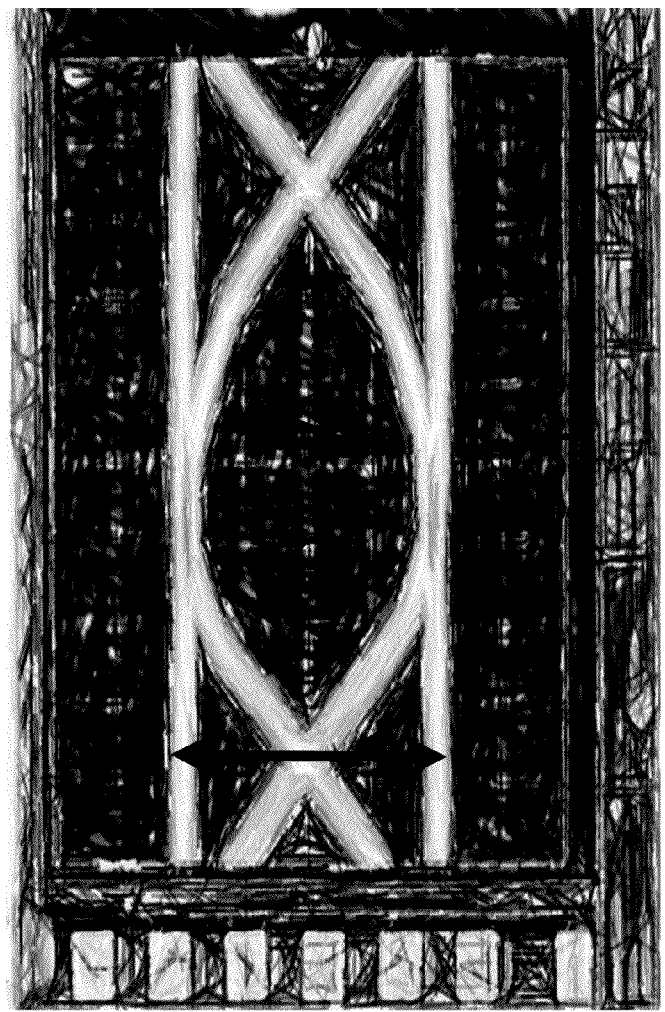

Measured Results – TX & RX
FIG. 9
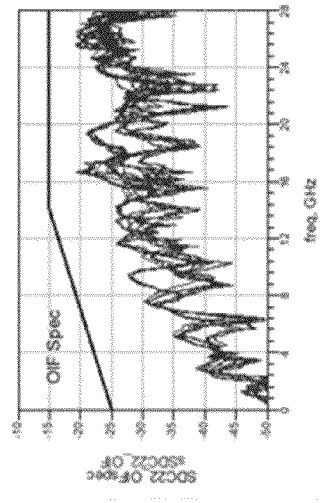
TX SDD22 (differential-mode) at test-point TP4 (module output)
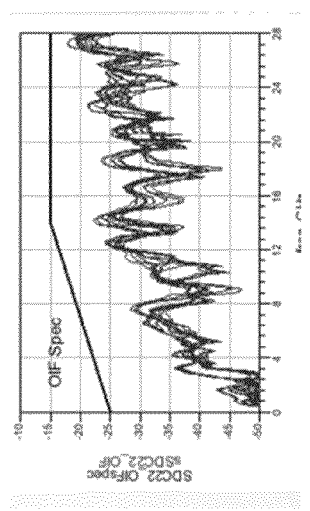
TX SDC22 (common-mode) at test-point TP4 (module output)
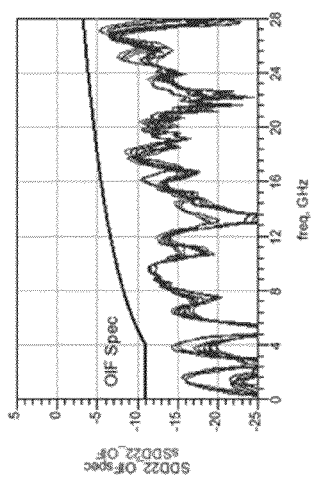
RX SDD11 (differential-mode) at test-point TP1 (module input)
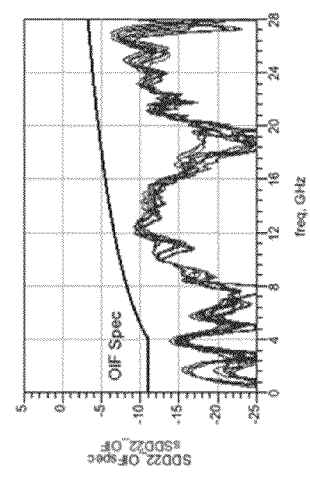
TX SDC11 (common-mode) at test-point TP1 (module input)

VOLTAGE REGULATOR FOR A SERIALIZER/DESERIALIZER COMMUNICATION APPLICATION

CROSS-REFERENCE TO RELATED APPLICATIONS

N/A

BACKGROUND OF THE INVENTION

The present invention relates generally to integrated circuits. More particularly, the present invention provides a circuit and method for regulating a voltage for a high speed serializer/deserializer device. But it will be recognized that the technique can be used for regulating memory devices (e.g., double data rate fourth generation (DDR4) synchronous dynamic random-access memory (SDRAM) devices, DDR4 register devices, DDR4 controller devices), and other high speed data applications.

As integrated circuits are designed to operate at increasingly higher frequencies, noisy, distorted, and/or inconsistent signals can cause devices such as output drivers to produce poor quality output. Preferably, an output driver may provide a clean, symmetric, well-shaped output waveform even if the input signals are noisy or of poor quality. However, a driver may receive an asymmetric, low quality differential signal with a substantial and/or inconsistent amplitude variation and/or a common mode component. In many cases, the quality of the differential input signal may degrade with increased operating frequency. An eye diagram, constructed by overlaying the output voltage waveforms for many clock cycles, may be used indicate the fidelity or quality of a signal put through an electronic buffer circuit. A high quality output waveform may have an eye diagram with a symmetric shape that approaches the shape of a square wave. Often, it is desirable to have an output waveform with a centered or controllable crossing point (the point where the rising and falling signals intersect). The output crossing point may be characterized by the crossing point voltage. For a differential output, each of the output waveforms has an associated crossing point voltage.

From the above, it is seen that techniques for improving output waveforms and regulating them are highly desirable.

BRIEF SUMMARY OF THE INVENTION

The present invention relates generally to integrated circuits. More particularly, the present invention provides a circuit and method for regulating a voltage for a high speed serializer/deserializer (SerDes) device. But it will be recognized that the technique can be used for regulating memory devices (e.g., DDR 4 SDRAM devices, DDR4 register devices, DDR4 controller devices), and other high speed data applications. Additionally, such techniques can be used for a variety of applications such as network and/or computer storage systems, computer servers, hand held computing devices, portable computing devices, computer systems, network appliances and/or switches, routers, and gateways, and the like.

In a specific example, the present invention provides a transmitter apparatus, e.g., SerDes, other. The apparatus has an incoming receiver device configured to receive a plurality of data streams. Each of the data streams has a first data rate and characterized in a first format, e.g., parallel. The incoming receiver is configured to transfer a second data stream having a second format, e.g., multiplexed serial signal. The apparatus has a serializer device coupled the incoming receiver device. In an example, the serializer device processes the second data stream to output a third data stream in a third format, e.g., interleaved serial format. The apparatus has a line driver (including pre-line driver) comprising a power input, which is coupled to the serializer device to output a four data stream in a fourth format, e.g., high speed serial with finite impulse response information, and output of a high speed serial data stream at a desired output voltage. The apparatus has a voltage regulator device coupled to supply power to the power input of the line driver.

In an example, the voltage regulator device has a wide band amplifier having an input reference voltage, Vref and an input feedback voltage, Vfbk. The device has a source follower coupled to the wide band amplifier, the source follower coupled to an output of the wide band amplifier. The device has a VDD source, a regulator output, and a current source coupled to the source follower and the VDD source. The device has a low frequency path comprising a first transistor. The first transistor has a first gate, a first source, and a first drain. The first source is coupled to the VDD source. The first gate is coupled to a slow node, and the first drain is coupled to the regulator output. The low frequency path comprises a RC network, which has a capacitor, a resistor (or other low pass filter), and the slow node configured between the resistor and the capacitor. The device has a high frequency path comprising a second transistor. The second transistor has a second gate, a second source, and a second drain. The second source is coupled to the VDD source. The second gate is coupled to a fast node, and the second drain is coupled to the regulator output.

In an example, the resistor is configured to isolate a first load capacitance of the first three terminal device. In an example, the source follower is configured to isolate a second load capacitance of the second three terminal device. In an example, the first format is a 100 Gigabit per second Ethernet format. In an example, the supplied power is characterized by a current and a voltage, the current ranging from 20 milli-Amps to 50 milli-Amps, and the voltage characterized by 0.9 volt to 1.05 volt. In an example, the voltage is programmable by adjusting a magnitude of the reference voltage. In an example, the line driver comprising a differential output comprising TXP and TXN. In an example, the regulator device further comprising feedback circuit coupled to the regulator output, or the feedback circuit coupled to the regulator output. In an example, the feedback circuit coupled to the regulator output and the feedback circuit comprising a first resistor coupled between the regulator output and a feedback node and a second resistor coupled between the feedback node and a ground potential. As an example, the high frequency path is coupled to a ground potential. The low frequency path is coupled to a ground potential. Of course, there are variations, alternatives, and modifications.

Benefits are achieved over conventional techniques. In an embodiment, the benefit includes a low power and power supply noise rejection and/or inefficiencies. As an example, the drop-out voltage can be about 200 milli-volts and less. In an example, the power supply rejection can be 30 dB across a wideband (e.g., 10 GigaHz and greater), but can be others. In an example, the regulator device provides a high quality regulator output supply to enable a line driver device to operate across a wide band of frequencies or data rate using a CMOS technology, which is often sensitive to power supply noise. Depending upon the specific embodiment, one or more of these benefits may be achieved. Of course, there can be other variations, modifications, and alternatives.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 3 is a detailed block diagram of a receiver module according to an embodiment of the present invention;

FIG. 4 is a detailed circuit diagram of a regulator device according to an embodiment of the present invention;

FIG. 5 is a macro plot of a quad SerDes module according to an embodiment of the present invention;

FIG. 6 is a simplified illustration of a TX eye scan according to an embodiment of the present invention;

FIG. 9 are multiple illustrations of measured results for TX and RX according to an embodiment of the present invention.

DETAILED DESCRIPTION OF THE INVENTION

The present invention relates generally to integrated circuits. More particularly, the present invention provides a circuit and method for regulating a voltage for a high speed serializer/deserializer (SerDes) device. But it will be recognized that the technique can be used for regulating memory devices (e.g., DDR 4 SDRAM devices, DDR4 register devices, DDR4 controller devices), and other high speed data applications. Additionally, such techniques can be used for a variety of applications such as network and/or computer storage systems, computer servers, hand held computing devices, portable computing devices, computer systems, network appliances and/or switches, routers, and gateways, and the like.

A limitation in optical networking is the development of low-power transceivers that interface to optical sub-assemblies, e.g., transmitter or receiver optical subassembly (TOSAs & ROSAs). Whilst SiGe technologies are often selected for jitter performance with optical links, especially on the egress path to the transmit optics, lower-power and higher levels of digital integration often result from CMOS approaches [1]. This specification describes a generic CMOS 25-30 Gb/s SerDes for use within clock data recovery (CDR) or gearbox applications, targeting the draft requirements of the OIF 28G-VSR (very short reach) standard [2] and suitable for both 100 GBASE-LR4/OTL4.4 gearbox & retiming applications, including CFP & CFP2 [3].

Figure 1:
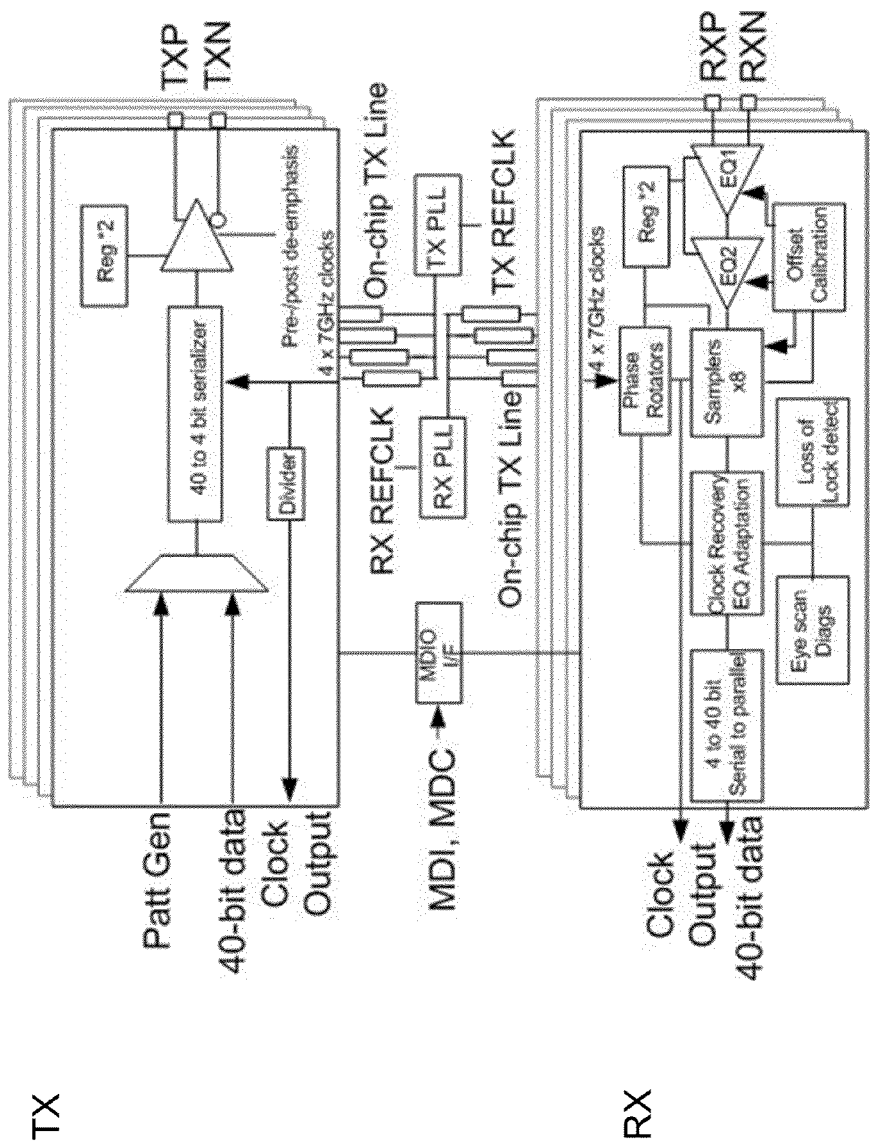
FIG. 1 is a simplified block diagram of a SerDes block diagram according to an embodiment of the present invention.

A block diagram of the SerDes is shown in FIG. 1. Two phase locked loops (PLLs) (separated for TX & RX to support a line retiming mode) with four quadrature 7.0 GHz phases for 28 Gb/s operation provide reference timing edges for both the transmitter & receiver. These are distributed using two sets of four on-chip transmission lines. Transmission line techniques minimize power consumption and timing skew between the four clock phases, this in turn reduces the requirements on the quadrature and duty-cycle correction of the clock phases. A MDIO (Management Data Input/Output) interface provides control of both transmitter & receiver and selection of diagnostic & debug modes. An additional electrical fuse interface (not shown) provides non-volatile storage for a range of programmable MDIO defaults and also manufacturing trim settings for the bandgap reference and regulators.

Figure 2:
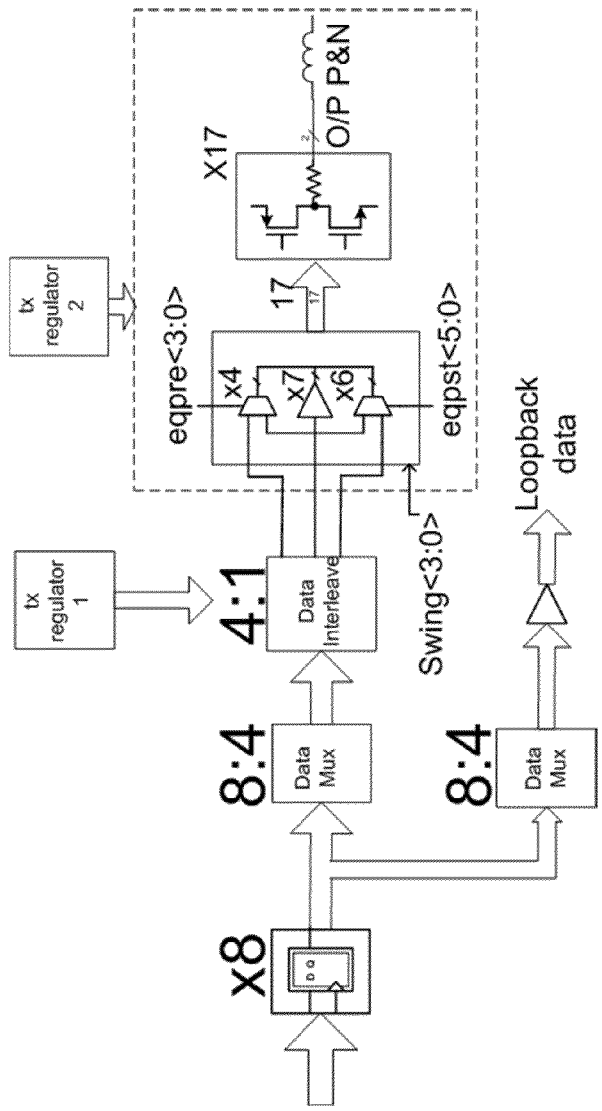
FIG. 2 is a more detailed block diagram of a transmitter module according to an embodiment of the present invention.
Figure 2A:
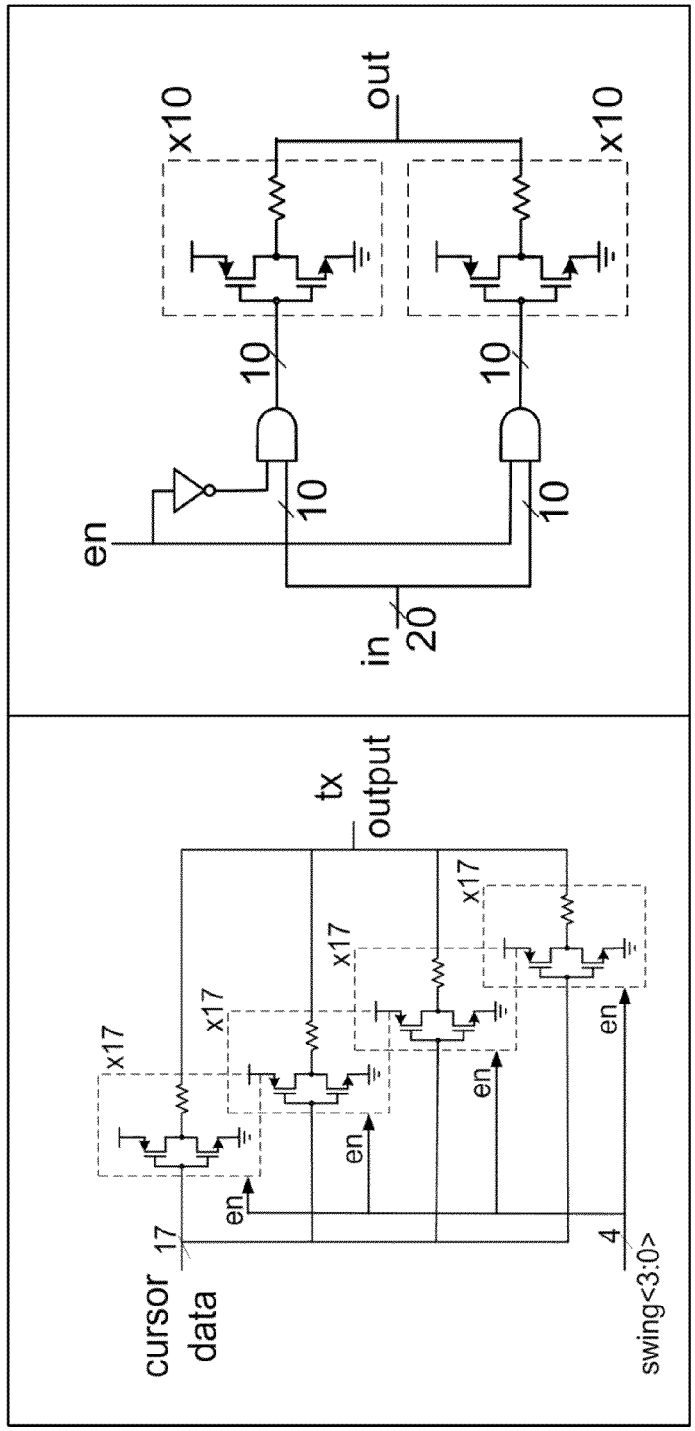
FIG. 2A is a more detailed block diagram of a portion of the transmitter module according to an embodiment of the present invention.

The transmitter is shown in FIG. 2. FIG. 2A shows more details on the predriver and the final output driver. Eight streams of data at 3.5 GHz are multiplexed into a 7.0 GHz data-nibble that is subsequently interleaved into a 28 Gb/s data-steam using the four 7 GHz PLL clock phases. The output stage is implemented as multiple instances of a smaller, basic structure providing four swing settings, and a 3-tap FIR filter with eight levels of post-cursor and four levels of pre-cursor de-emphasis. The de-emphasis provides a high-pass filter function to compensate for line losses [4], [5], and the maximum levels of de-emphasis are 15% (pre-cursor) and 35% (post-cursor), with 5% resolution, as an example. These ranges are generous providing compatibility with existing receivers without integrated equalization. The line driver is voltage-mode to minimize power consumption and has a trimmed series termination including an on-chip inductor to optimize or improve high-frequency return loss (←10 dB at 10 GHz with package). The line-driver and inter-leaver stages are fed from separate regulators to minimize both board-level noise injection and self-induced supply disruption. Two regulators are used to isolate data dependent noise contributions from the clocking circuitry and large cyclo-stationary noise sources (clock buffers) from the main data-path. Of course, there can be variations.

Figure 3A:
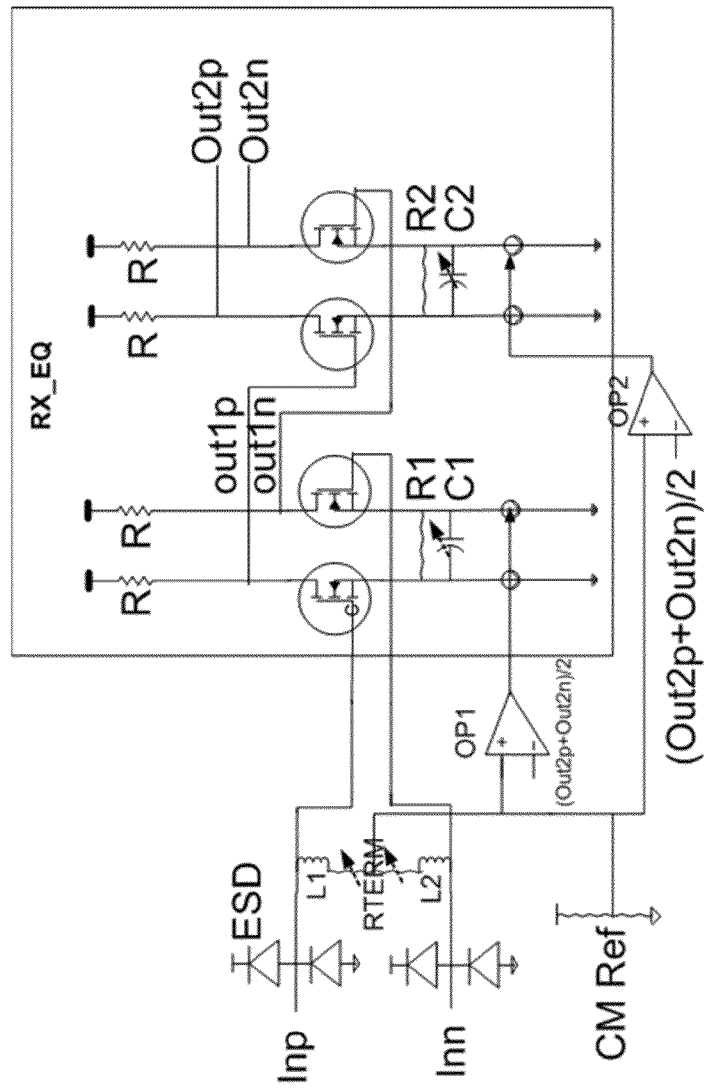
FIG. 3A is a more detailed block diagram of a receiver module according to an embodiment of the present invention.

The receiver & equalizer are shown in FIGS. 3 and 3A. T-Coils and trimmed resistive terminations again optimize or improve the return loss. The equalizer has two cascaded gain stages with both configurable pole-zero locations and bandwidth, producing ~13 dB of gain-peaking at 14 GHz. A continuous-time linear equalizer (CTLE), adjustable by two capacitors & two resistors, provides adequate equalization for [2] without suffering the power penalty of a Decision Feedback Equalizer (DFE) [4], [5]. Common-mode feedback (CMFB) is used to independently bias both equalizer stages and offset calibration is applied to both equalizer stages and the data-samplers. A programmable reset sequencer selects the offset calibration mode and initiates auto-zeroing. The equalization adaptation algorithm is continuous-time and minimizes the post-cursor contributions to the symbol response whilst compensating for the temperature dependence of the channel loss and receiver front-end by tuning C1, R1, C2 & R2. As with the transmitter, separate regulators are used for the cyclo-stationary and data dependent circuits.

Eight data samplers are used at 7 GS/s in a quarter-rate bang-bang configuration. Additional circuitry is used to implement non-destructive, asynchronous eye-scan diagnostics that operates without disrupting normal data traffic. Second-order clock recovery minimizes static phase offsets on the sampler clocks and a 128-step DAC controlled phase mixer/rotator completes the clock recovery loop, meeting 100 GBASE-LR4 and OTL4.4 jitter tolerance requirements (5 UI at 100 kHz and 0.05 UI at 10 MHz) [2], [3]. The CDR loop dynamics are determined by digital algorithms and are directly programmable by MDIO registers or electronic or electrical fuses. These are ATPG (Automatic Test Pattern Generator) testable and are not defined by component or charge pump current values. The phase interpolator includes two mixing stages and provides each of the 4 differential clock phases for the data samplers.

Regulator power supply rejection (PSRR) performance is fundamental to reducing deterministic jitter in a high speed CMOS SerDes. FIG. 4 shows a novel PMOS based low drop-out regulator with the use of both low and high frequency correction loops to enhance the PSRR. The drop-out is sub-150 mV over all PVT conditions. Over 30 dB of PSRR is obtained up to 1.5 GHz, easing system integration and enhancing link performance. The regulator compensates for Monte Carlo variations using pre-programmed offsets stored in an electrical fuse array resulting in an area efficient circuit with both high-bandwidth and low amplifier offsets. A compact, efficient regulator design permits the use of multiple instantiations to improve noise isolation in the transmitters, receivers and PLL. In an example, the present regulator is efficient. That is, the amount of power consumed against the amount of power delivered to the load is 95 percent and greater to about 99 percent, although there are variations.

In an example, the voltage regulator device has a wide band amplifier having an input reference voltage, Vref and an input feedback voltage, Vfbk. The device has a source follower coupled to the wide band amplifier, the source follower coupled to an output of the wide band amplifier. The device has a VDD source, a regulator output, and a current source coupled to the source follower and the VDD source. The device has a low frequency path comprising a first transistor. The first transistor has a first gate, a first source, and a first drain. The first source is coupled to the VDD source. In an example, the VDD source can be fairly low such as 1.2 Volt or lower, e.g., 1.0 Volt. The first gate is coupled to a slow node, and the first drain is coupled to the regulator output. The low frequency path comprises a RC network, which has a capacitor, a resistor, and the slow node configured between the resistor and the capacitor. Alternatively, the RC network can be any low pass filter, or device such as a switched capacitor or other similar device to achieve the same or similar function. The device has a high frequency path comprising a second transistor. The second transistor has a second gate, a second source, and a second drain. The second source is coupled to the VDD source. The second gate is coupled to a fast node, and the second drain is coupled to the regulator output. In an example, VDD can be 1.2 Volt and lower and the regulator output is respectively 1.0 Volt and lower, although there can be variations. In an example, the power efficiency (between input power and output) can be about 80 percent to about 90 percent and greater. In an example, VDD and the regulator output can have a voltage loss of 200 milli-volts (or 150 milli-volts) and less, although can be slight variations. In an example, the frequency range applied the regulator can achieve a wide band ranging from DC to 30 Giga-Hertz.

A quad SerDes measures 2.4 mm×1.5 mm and is implemented in a TSMC 40G technology (FIG. 5). The worst-case power at high voltage and temperature is 225 mW per TX/RX lane, including PLL & clocking overheads at 28 Gb/s. Data links can be sustained with a BER of <10-15 over −13 dB channels with +/−200 ppm frequency offsets.

Figure 7:
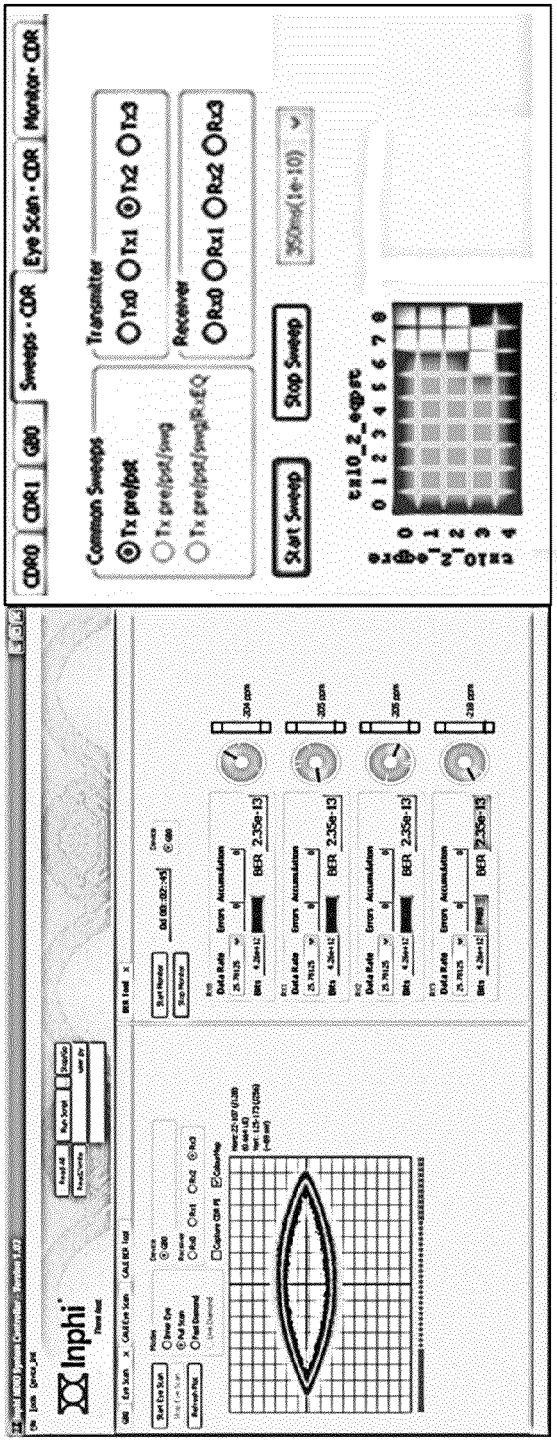
FIG. 7 is a simplified diagram of measured information of a RX eye scan according to an embodiment of the present invention.
Figure 8:
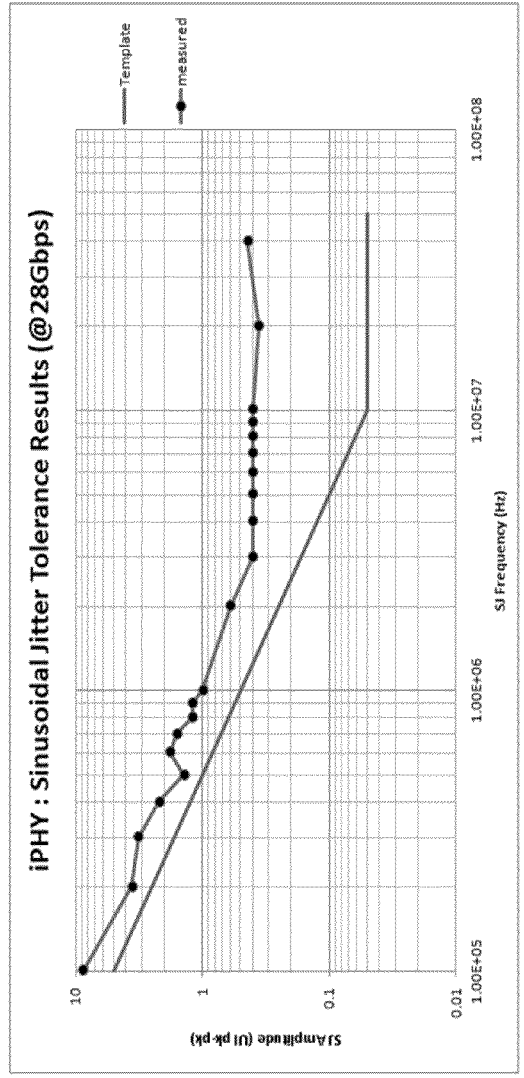
FIG. 8 is a plot of sinusoidal jitter information according to an embodiment of the present invention.

Lab measurements at 28 Gb/s are shown in FIG. 6. Other measurements are shown in FIGS. 7, 8, and 9. The TX eyes are shown with 10% post-cursor de-emphasis and also when de-embedded to the ball with no applied transmitter de-emphasis. Random jitter (Rj) is measured at 0.35 ps RMS in the 100 kHz-1 GHz band and 150 fs with a 10 MHz high-pass filter to allow for receiver CDR tracking [3]. The internal eye-scan plot has a resolution of 128×256 samples and shows the post-equalized eye at the data samplers. In this example there is a 0.83 UI×276 mV eye opening from a −5 dB test-channel where the received data is frequency offset from the system clock by +200 ppm. The FIR sweep shows a plot of BER (colour) for the complete range of pre-cursor & post-cursor de-emphasis settings, the green region indicates that a wide range of TX FIR de-emphasis settings are error-free.

Figure 10:
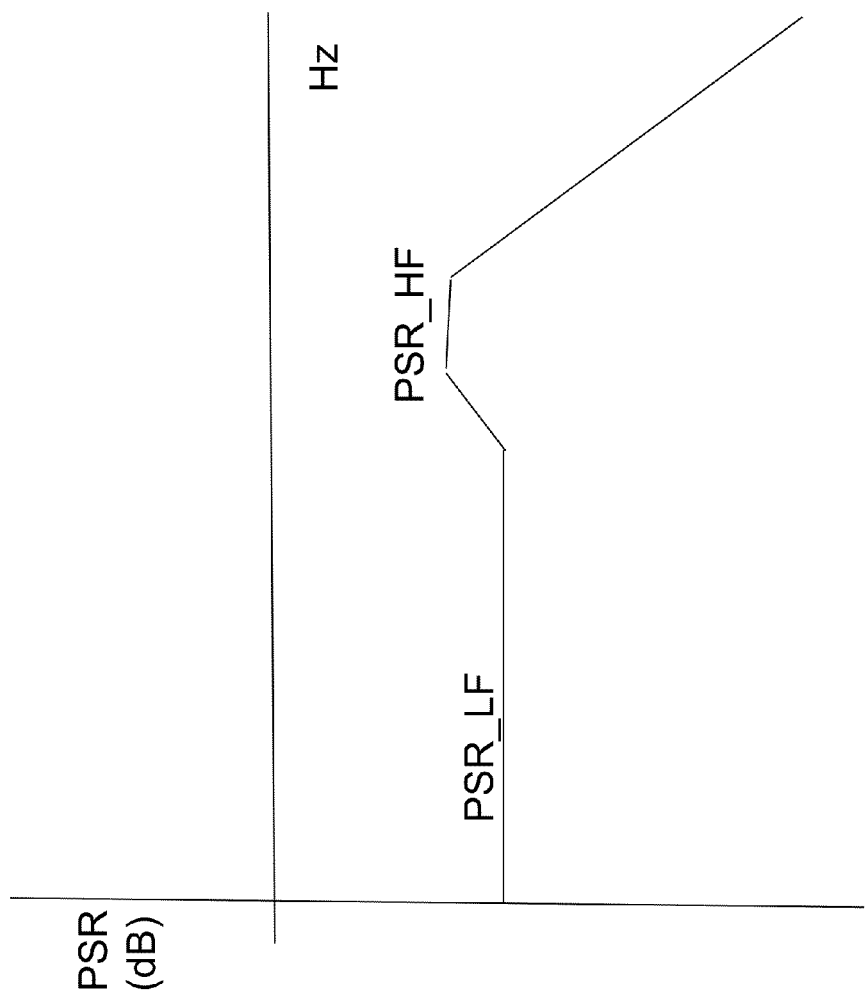
FIG. 10 illustrates a plot of power supply noise information according to an embodiment of the present invention.

FIG. 10 illustrates a plot of power supply noise information according to an embodiment of the present invention. As shown, the plot has frequency in hertz against power supply rejection. At low frequency and greater, we achieved 35 dB, while at high frequency we achieved a minimum of 25 dB, which are desirable and demonstrates the benefits of the present device and related methods.

CITED REFERENCES

[1] K Wu et al, "A 2×25 Gb/s receiver with 2:5 DMUX for 100 Gb/s Ethernet."
[2] OIF2010.404.04: CEI-28G-VSR draft IA
[3] IEEE 802.3ba 22 Jun. 2010 Part 3: CSMA/CD Access Method and Physical Layer Specifications.
[4] A. K. Joy et al, "Analog DFE Based 16 Gb/s SerDes in 40 nm CMOS that operates across 34 dB Loss channels at Nyquist with a baud rate CDR and 1.2V voltage mode driver," ISSCC Dig Tech Papers, pp 350-351, February 2011.
[5] M Harwood, N Warke et al !A 12.5 Gb/s SerDes in 65 nm CMOS using a baud rate CDR with Digital Receiver Equalization & Clock Recovery," ISSCC Dig Tech Papers, pp 436-7, February 2007.
[6] C Mentofi et al, "A 16 Gb/s Source Series Terminated Transmitter in 65 nm CMOS SOI," ISSCC Dig Tech Papers, pp 446-7, February 2007.
[7] D Kam et al, "Is 25 Gb/s On-board Signalling Viable?," IEEE Transactions on Advanced Packaging, vol 32, No. 2, May 2009.

Although the above has been described in terms of a specific embodiment, the present device and related methods can be used in other applications. That is, the present regulator can be configured on any line driver configured using a CMOS technology and the line driver having a high quality eye diagram having low jitter, including random jitter and deterministic jitter. The driver is preferably an SST (Source Serial Terminated) driver using CMOS technology, which uses a high quality power supply for VDD. The high quality power supply has a variation of less than 10 milli-volt for a 1 Volt, which is less than 1 percent variation (peak to peak) during operation of the line driver. In an alternative example, the power supply variation is less than 1 milli-volt for a 1 Volt supply. The variation is also for a line driver configured with a frequency band of DC to 30 Giga-Hertz. Of course, there can be other variations, alternatives, and modifications.

In an example, the supplied power is characterized by a current and a voltage, the current ranging from 20 milli-Amps to 50 milli-Amps, and the voltage characterized by 0.9 volt to 1.05 volt. The voltage is programmable by adjusting a magnitude of the reference voltage. In an example, the feedback circuit coupled to the regulator output. The feedback circuit coupled to the regulator output. The feedback circuit comprises a first resistor coupled between the regulator output and a feedback node and a second resistor coupled between the feedback node and a ground potential. In an example, the high frequency path is characterized by a frequency range from about 500 Megahertz to 10 Gigahertz. The low frequency path is characterized by a frequency range from about DC to 500 Megahertz. The low frequency path comprises a RC network. The RC network comprising a capacitor, a resistor, and the slow node configured between the resistor and the capacitor. Of course, there can be variations.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A transmitter apparatus comprising:
   an incoming receiver device configured to receive a plurality of data streams, each of the data streams having a first data rate and characterized in a first format, the incoming receiver configured to transfer a second data stream having a second format;
   a serializer device coupled the incoming receiver device, the serializer device processes the second data stream to output a third data stream in a third format;
   a line driver comprising a power input, the line driver coupled to the serializer device to output a four data stream in a fourth format;
   a voltage regulator device coupled to supply power to the power input of the line driver, the voltage regulator device comprising:
      a wide band amplifier having an input reference voltage, Vref and an input feedback voltage, Vfbk;
      a source follower coupled to the wide band amplifier, the source follower coupled to an output of the wide band amplifier;
      a VDD source;
      a regulator output;
      a current source coupled to the source follower and the VDD source;
      a low frequency path comprising a first transistor, the first transistor having a first gate, a first source, and a first drain, the first source coupled to the VDD source, the first gate coupled to a slow node, and the first drain coupled to the regulator output, the low frequency path comprising RC network, the RC network comprising a capacitor, a resistor, and the slow node configured between the resistor and the capacitor; and
      a high frequency path comprising a second transistor, the second transistor having a second gate, a second source, and a second drain, the second source coupled to the VDD source, the second gate coupled to a fast node, and the second drain coupled to the regulator output.

2. The apparatus of claim 1 wherein the first format is a 100 Gigabit per second Ethernet format.

3. The apparatus of claim 1 wherein the supplied power is characterized by a current and a voltage, the current ranging from 20 milli-Amps to 50 milli-Amps, and the voltage characterized by 0.9 volt to 1.05 volt.

4. The apparatus of claim 3 wherein the voltage is programmable by adjusting a magnitude of the reference voltage.

5. The apparatus of claim 1 wherein the line driver comprising a differential output comprising TXP and TXN.

6. The apparatus of claim 1 further comprising a feedback circuit coupled to the regulator output.

7. The apparatus of claim 5 further comprising a feedback circuit coupled to the regulator output.

8. The apparatus of claim 1 further comprising a feedback circuit coupled to the regulator output, the feedback circuit comprising a first resistor coupled between the regulator output and a feedback node and a second resistor coupled between the feedback node and a ground potential.

9. The apparatus of claim 1 wherein the high frequency path is coupled to a ground potential.

10. The apparatus of claim 1 wherein the low frequency path is coupled to a ground potential.

11. A voltage regulator device configured for a line driver application, the device comprising:
    a wide band amplifier having an input reference voltage, Vref and an input feedback voltage, Vfbk;
    a source follower coupled to the wide band amplifier, the source follower coupled to an output of the wide band amplifier;
    a VDD source;
    a regulator output;
    a current source coupled to the source follower and the VDD source;
    a low frequency path comprising a first transistor, the first transistor having a first gate, a first source, and a first drain, the first source coupled to the VDD source, the first gate coupled to a slow node, and the first drain coupled to the regulator output; and
    a high frequency path comprising a second transistor, the second transistor having a second gate, a second source, and a second drain, the second source coupled to the VDD source, the second gate coupled to a fast node, and the second drain coupled to the regulator output.

12. The device of claim 11 wherein the supplied power is characterized by a current and a voltage, the current ranging from 20 milli-Amps to 50 milli-Amps, and the voltage characterized by 0.9 volt to 1.05 volt.

13. The device of claim 12 wherein the voltage is programmable by adjusting a magnitude of the reference voltage.

14. The device of claim 11 further comprising a feedback circuit coupled to the regulator output.

15. The device of claim 11 further comprising a feedback circuit coupled to the regulator output, the feedback circuit comprising a first resistor coupled between the regulator output and a feedback node and a second resistor coupled between the feedback node and a ground potential.

16. The device of claim 11 wherein the high frequency path is characterized by a frequency range from about 500 Megahertz to 10 Gigahertz.

17. The device of claim 11 wherein the low frequency path is characterized by a frequency range from about DC to 500 Megahertz; the low frequency path comprising RC network, the RC network comprising a capacitor, a resistor, and the slow node configured between the resistor and the capacitor.

18. The device of claim 11 wherein the high frequency path is coupled to a ground potential; and the low frequency path is coupled to a ground potential.

19. The device of claim 11 wherein the source follower comprising a three terminal device characterized pMOS device.

20. A voltage regulator device comprising:
a wide band amplifier having an input reference voltage, Vref and an input feedback voltage, Vfbk;
a source follower coupled to the wide band amplifier, the source follower coupled to an output of the wide band amplifier;
a VDD source;
a regulator output;
a current source coupled to the source follower and the VDD source;
a low frequency path comprising a first transistor, the first transistor having a first gate, a first source, and a first drain, the first source coupled to the VDD source, the first gate coupled to a slow node, and the first drain coupled to the regulator output, the low frequency path comprising RC network, the RC network comprising a capacitor, a resistor, and the slow node configured between the resistor and the capacitor; and
a high frequency path comprising a second transistor, the second transistor having a second gate, a second source, and a second drain, the second source coupled to the VDD source, the second gate coupled to a fast node, and the second drain coupled to the regulator output; and
whereupon the resistor is configured to isolate a first load capacitance of a first three terminal device;
whereupon the source follower is configured to isolate a second load capacitance of a second three terminal device.

\* \* \* \* \*